No. 709,125. Patented Sept. 16, 1902.
J. UNSER.
BRAKE MECHANISM FOR MOTOR VEHICLES.
(Application filed Oct. 31, 1901.)
(No Model.) 2 Sheets—Sheet 1.
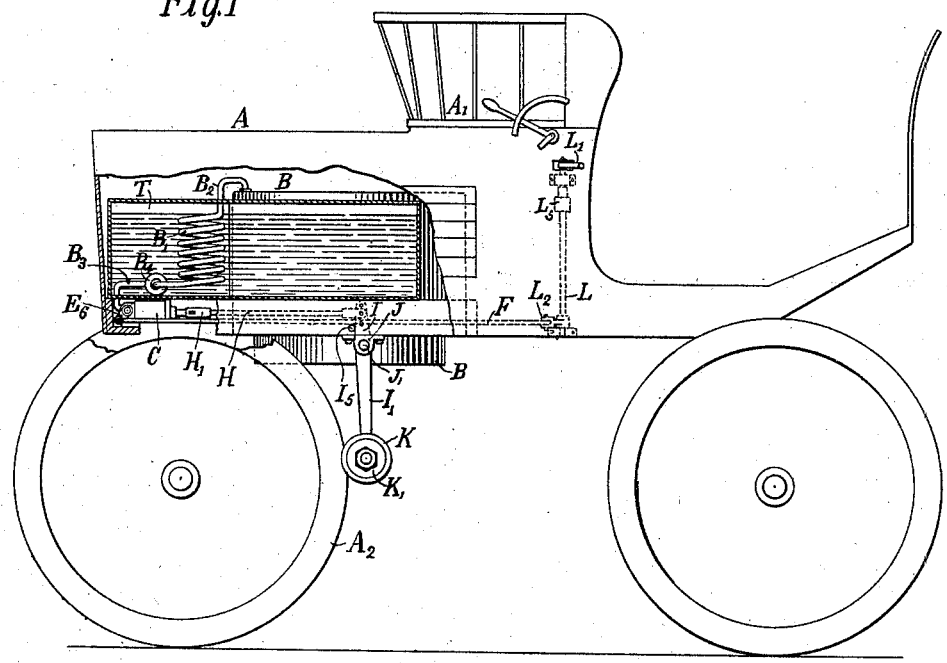
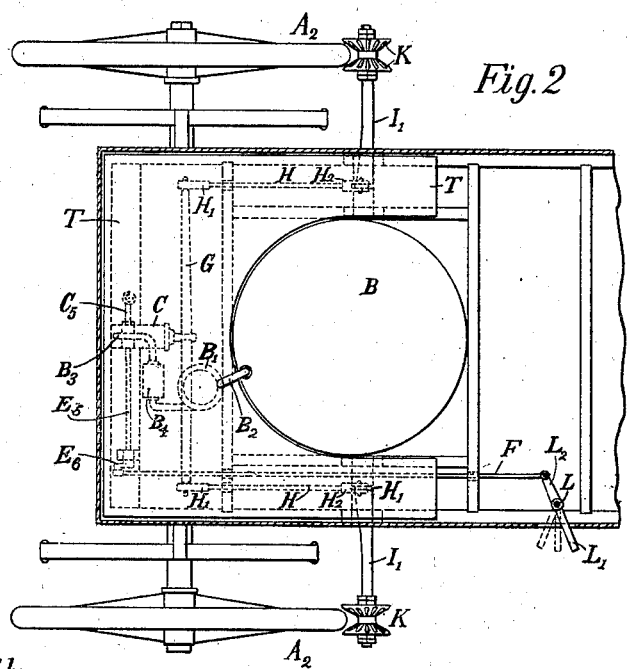
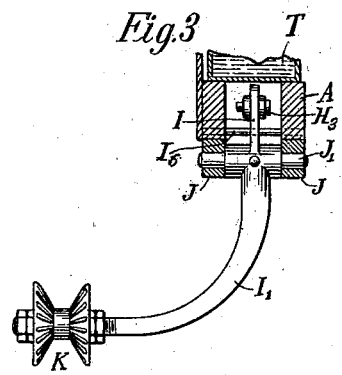
Witnesses:
Raphaël Ketter
Alexander Mitchell
John Unser Inventor
by Frederick S. Duncan Atty No. 709,125. Patented Sept. 16, 1902.
J. UNSER.
BRAKE MECHANISM FOR MOTOR VEHICLES.
(Application filed Oct. 31, 1901.)
(No Model.) 2 Sheets—Sheet 2.
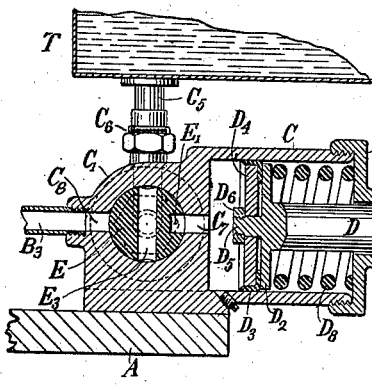
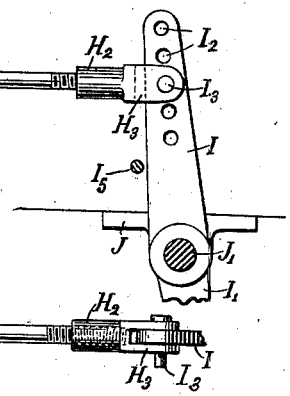
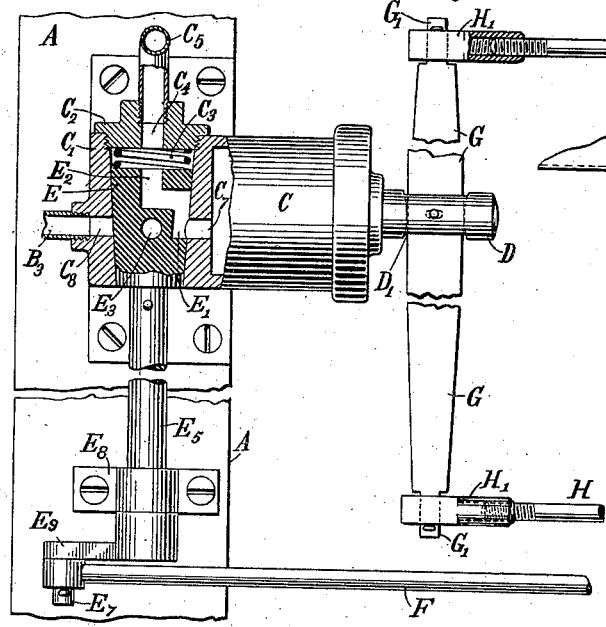
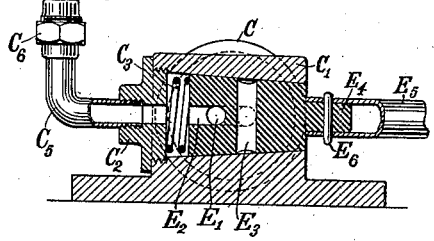
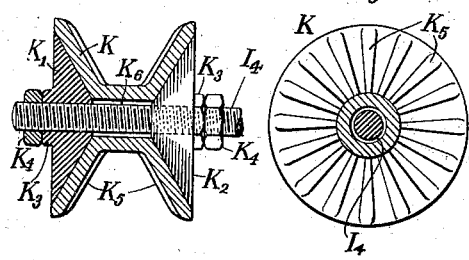
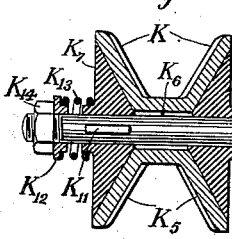
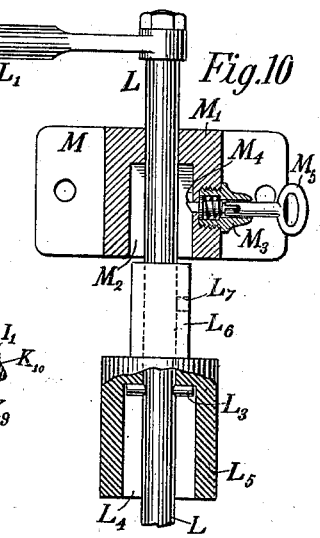
Witnesses:
Raphaël Netter
Alexander Mitchell
John Unser, Inventor
by Frederick S. Duncan, Atty

UNITED STATES PATENT OFFICE.

JOHN UNSER, OF CARTHAGE, NEW YORK, ASSIGNOR OF ONE-HALF TO WILLIAM W. HAWES, OF CLAYTON, NEW YORK.

BRAKE MECHANISM FOR MOTOR-VEHICLES.

SPECIFICATION forming part of Letters Patent No. 709,125, dated September 16, 1902.

Application filed October 31, 1901. Serial No. 80,622. (No model.)

*To all whom it may concern:*

Be it known that I, JOHN UNSER, a citizen of the United States, residing at Carthage, in the county of Jefferson and State of New York, have invented a new and useful Improvement in Brake Mechanism for Motor-Vehicles, of which the following is a specification, taken in connection with the accompanying drawings.

My invention relates to a novel form of brake mechanism for motor-vehicles, more especially applicable to steam motor-vehicles, and to the combination therewith of an improved locking device for such brake mechanism and also to improved brake-wheels for engaging the wheels of the motor-vehicles.

Such of my inventions as are shown but not claimed in this application are claimed in my copending application, Serial No. 50,329, filed March 8, 1901.

In the accompanying drawings, in which the same reference characters refer to similar parts of the various figures, Figure 1 is a side elevation of the motor-vehicle to which my brake mechanism has been applied, parts being shown in section. Fig. 2 is a partial plan view of the same. Fig. 3 shows a brake-arm. Fig. 4 is a sectional view taken through the axis of the cylinder, showing the valve and connections. Fig. 5 is a plan view of the same. Fig. 6 is a detail view of the valve. Figs. 7, 8, and 9 show the brake-wheels. Fig. 10 is a detail of the locking device.

A represents the body of the motor-vehicle, having the seat A' and provided with the usual steam driving-gear by which the traction-wheels $A^2$ are driven by the boiler B. This boiler, which is of the usual cylindrical form, as indicated in Fig. 2, is inclosed by the water-tank T, in which a supply of water is carried for use in the boiler. The condenser-worm B', in the form of a helical coil of pipe, is placed in the water-tank T, and the storage-chamber $B^4$, connected to the lower end of the condenser-worm, serves to store a quantity of water which has been condensed by the worm. The pipe $B^3$ supplies the condensed water to the valve-casing C', this pipe communicating with the inlet-port $C^3$ in this casing. The valve-casing is formed integral with the cylinder C and is secured to the frame of the vehicle A by suitable screws indicated. The cylinder-port $C^7$, formed in the casing directly opposite the inlet-port, communicates with the interior of the cylinder. The discharge-pipe $C^5$, emptying into the water-tank T, as indicated, communicates with the port $C^4$ in the screw-cap $C^2$, which serves to close the valve-casing. The three-way valve E is formed tapering, as indicated in Fig. 5, and this valve is formed with the through-passage $E^3$, which serves to admit fluid to the cylinder, and with the discharge-passage $E'$ $E^2$, which serves to discharge fluid from the cylinder by putting the cylinder-port $C^7$ into communication with the discharge-pipe $C^5$. The spiral spring $C^3$ serves to hold the valve in proper engagement with the valve-casing, so as always to make a tight joint therewith. Within the cylinder is the piston D, formed with the head $D^2$ integral therewith. The cup-leather packing $D^3$ is clamped upon the piston-head by the clamping-plate $D^4$, screwed in position by the nut $D^6$, which engages the threaded extension $D^5$ of the piston-rod. The outer end of the piston-rod D is slotted at D', so that the equalizer G in the slot is loosely pinned to the piston-rod, as shown. To either side of the equalizer is connected the brake-link H. The enlarged end H', which, as indicated, has a screw connection with the body of the link, passes over the reduced portion G' of the equalizer G. The slotted head $H^2$, screwed upon the other end of the link, is pivotally connected to the brake-arm I by the pin $I^3$, which passes through any one of a series of holes $I^2$ in the upper end of the brake-arm and through the slotted portion $H^3$ of the link. As indicated in Figs. 3 and 4, the stop-pin $I^5$, secured to the frame of the vehicle, is located adjacent each of the brake-arms I. The brake-arm I, which has the general curved form indicated in Fig. 3, moves about the pivot J', which engages a bearing J, secured to the frame of a vehicle. The lower curved portion I' of the brake-arm extends outward, so that the brake-wheel K, mounted at the outer end of the brake-arm, engages the traction-wheel $A^2$ of the vehicle in the manner indicated in Figs. 1 and 2. The brake-wheel is preferably constructed as indicated in Fig. 7, the brake-wheel K being formed with the tapered groove indicated and a series of radial ribs $H^5$ being formed on the inside of the groove to grip the vehicle-tire more firmly. This brake-wheel is mounted between the two brake-cones $K'$ and $K^2$, which are rigidly fastened to the threaded extension $I^4$ of the brake-arm. The hole $K^6$ in the brake-wheel is sufficiently large so that the wheel does not engage the part $I^4$ at this point. These brake-cones are provided with hexagonal extensions $K^3$ on the outside of the same, and by this means the brake-cones may be adjusted as desired upon the threaded extension of the brake-arm and secured in any desired position by the lock-nuts $K^4$ indicated. It is intended that the brake-cones shall be adjusted so that the brake-wheel K fits loosely between them. In actual operation, therefore, the brake-wheel does not engage throughout its whole circumference with the brake-cones, but the wear occurs over only part of the surface of the brake-cones. It is certain, therefore, that with this construction the brake-wheel shall always be free to revolve, and there is very little danger of causing an injurious abrasion of the tire of the vehicle. The brake-wheel grips the tire of the vehicle so firmly that practically no slip occurs between the tire and the brake-wheel, and all the wear therefore occurs between the brake-wheel and the brake-cones.

Instead of the construction of brake-wheel just described I may under some circumstances employ the brake-wheel indicated in Fig. 9, in which the brake-wheel K is formed substantially as indicated, with the central opening $K^6$ loosely fitting over the end $I'$ of the brake-arm. The two brake-cones $K^7$ and $K^8$ are mounted upon the end of the brake-arm, the cone $K^8$ being rigidly secured thereto by the pin $K^{10}$ passing through the flange $K^9$ on the cone and also passing through the end of the brake-arm. The cone $K^7$ on the other side of the brake-wheel is prevented from rotating with respect to the brake-arm by means of a key $K^{11}$, which engages the cone and the part $I'$. The spiral spring $K^{13}$, which is adjusted by the nut $K^{14}$, which engages the collar $K^{12}$, serves to force the two cones together with any desired degree of pressure. With this construction, therefore, the brake-wheel is gripped by the cones with any force desired, so that the friction on the brake-wheel may be adjusted to meet the particular demands of the brake mechanism.

The valve is operated by the valve-stem $E^5$, secured to the reduced extension $E^4$ of the valve by the pin $E^6$. (Indicated in Fig. 6.) This valve-stem is mounted in a suitable bearing $E^8$, secured to the frame of the vehicle, and has formed upon its outer end the crank-arm $E^9$. The connector F is secured at its rear end to the crank-pin $E^7$, and its forward end is pivotally connected to the crank-arm $L^2$ on the brake-rod L, which is mounted in a vertical position in suitable bearings secured to the vehicle. The upper bearing $M'$, formed in the standard M, serves also as a locking means for the brake-rod L. The locking-piece $L^5$ is splined to the brake-rod by the pin $L^3$, which engages a keyway $L^4$ in the locking-piece. The upper end $L^6$ of this locking-piece is squared and is formed with the hole $L^7$. The bearing $M'$ is formed with the corresponding square hole $M^2$, so arranged that when the brake-handle $L'$ is moved into position to actuate the brake the locking-piece may be pushed upward into the hole in the bearing, and thereupon the spring-catch $M^4$ engages the hole $L^7$ and holds the locking-piece in that position. This prevents any turning of the brake-rod L. As will be seen from Fig. 10 of the drawings, the spring-catch $M^4$ is forced inward by the spiral spring, and these parts are mounted in the nipple $M^3$, screwed into the side of the bearing. The key $M^5$ may be inserted into the nipple, and the bayonet-slot indicated engages the pin upon the reduced outer end of the catch. In this manner the catch may be withdrawn when desired from the hole $L^7$ in the locking-piece, so that the locking-piece may then be withdrawn from the bearing and the brake-rod operated by the brake-handle in the ordinary manner.

The brake-handle $L'$ upon the upper end of the brake-rod projects outward through a suitable opening in the vehicle-body, so that it may be readily operated. When in the forward position, (indicated in full lines in Fig. 2,) the brake-handle, through the connecting mechanism just described, holds the valve in the discharge position, (indicated in Fig. 5,) while if the handle is moved to the rearmost position (indicated in dotted lines) the valve would be moved through a quarter of a revolution to bring the through-passage $E^3$ into coaction with the inlet-port $C^8$ and the cylinder-port $C^7$ to admit fluid into the cylinder. This fluid, which, as will be readily understood, is maintained in the condenser-worm and storage-chamber under boiler-pressure, at once flows into the cylinder and forces the piston outward against the force of the spiral spring $D^8$ and serves to force each of the brake-wheels K back into engagement with the vehicle-tires. Since also a slight freedom of movement is allowed between the equalizer G and the piston-rod D, the brakes are applied with substantially equal force to both the wheels of the vehicle, so that the braking action is uniform on both. The amount of movement of either one of the brake-arms may be adjusted to the extent desired by adjusting the brake-links H in their end pieces and also by securing the pin $I^3$ in any one of the holes $I^2$ in the brake-arms. If the brake-handle $L'$ is moved to the forward position, (indicated in full lines in Fig.

2,) the fluid in the cylinder passes through the discharge-passage and is discharged into the water-tank, because the spiral spring $D^8$ within the cylinder forces the piston rearward. This of course withdraws the brakes from the wheels of the vehicle, and the piston moves backward until the brake-arms I come into contact with the stop-pins $I^5$, secured to the frame of the vehicle adjacent the brake-arms. In this way it will be evident that the pressure of the spring serves to tighten all the joints in the brake-links and equalizer, so that these parts are prevented from rattling. It will be apparent that if the brake-handle is moved into the intermediate position (indicated in dotted lines of Fig. 2) all communication with the cylinder-port will be cut off by the valve, so that if the valve is in this position the fluid in the cylinder is held there, and the brake may therefore be held firmly in any desired position.

This fluid-operated brake has proved to be very advantageous in practical operation on steam motor-vehicles. The brake is entirely noiseless in its application, and it will be noted that with this construction the fluid used in the brake-cylinder is discharged therefrom into the water-tank, so that there is no fluid discharged into the street, and, furthermore, there is no water wasted, the condensed steam which has been used in the brake-cylinder being returned to the water-tank for subsequent use in the boiler. By placing the condenser-coil B' in the water-tank the coil is kept cool and the condensation of steam therein is very much more rapid than it would be if the coil were placed in the air. Furthermore, all the heat given off by the condensation of the steam is utilized in warming the water in the tank, so that the water fed into the boiler is raised in temperature, and fuel is thereby economized. The storage-chamber $B^4$, formed at the lower end of the condenser-coil B', serves to hold a sufficient supply of water to actuate the brake a number of times, so that with this construction the brake may be applied as many times as desired and sufficient water will always be at hand to actuate it, owing to the supply in the storage-chamber and also to the rapid condensation in the water-cooled worm. By using this form of brake and the locking device which I have indicated a very efficient safety appliance is secured, since by locking the brake in operative position it is impossible to move the motor-vehicle until the locking-piece has been released by the key. This prevents the stealing of the motor-vehicle or its operation by improper persons.

Many modifications may be made in the details of construction of this brake mechanism without departing from the spirit of my invention. Furthermore, parts of this brake mechanism may be used without employing the whole of the same. I do not, therefore, wish to be limited by the disclosure which I have made in this case; but what I wish to secure by Letters Patent is set forth in the appended claims.

I claim—

1. In a brake mechanism for motor-vehicles, a steam-boiler, a water-tank, a condenser-worm in said water-tank connected with the steam-space of said boiler, a storage-chamber formed at the lower end of said worm, a brake-cylinder mounted on the frame of said vehicle, a valve-casing formed on said cylinder and communicating with the interior of the same, with said storage-chamber and with said water-tank, a spring-actuated piston in said cylinder, an equalizer loosely connected with said piston, brake-arms connected to said equalizer by brake-links, brake-cones secured to the outer end of said brake-arms, brake-wheels mounted between said brake-cones to engage the wheels of the vehicle, a spring-pressed three-way valve in said valve-casing, a brake-handle connected to said valve to admit condensed steam from said storage-chamber into said cylinder to actuate the brake and to discharge the water from said cylinder into said tank and a locking-piece secured to said brake-handle to maintain said brake in operative position.

2. In a brake mechanism for motor-vehicles, a brake-cylinder, a piston in said cylinder, brakes actuated from said piston, a valve-casing secured to said cylinder, a boiler, a water-tank adjacent said boiler, a condenser-worm in said water-tank communicating with the steam-space in said boiler and connected to said valve-casing, said valve-casing being connected to said water-tank and communicating with said cylinder, a valve in said casing to admit water from said worm into said cylinder and to discharge such water from said cylinder into said tank.

3. In a brake mechanism for motor-vehicles, a liquid-operated brake, a boiler, a water-tank, a condenser-worm communicating with the steam-space in said boiler, a valve and connections therefor to actuate said brake by water from said condenser-worm and to discharge such water into said water-tank.

4. In a brake mechanism for motor-vehicles, a fluid-actuated brake, a boiler, a water-tank, a condenser-worm located in said water-tank and communicating with the steam-space in said boiler, a storage-chamber at the lower end of said worm, a valve and connections therefor to admit water from said storage-chamber to said brake and to discharge such water into said water-tank.

5. In a brake mechanism for motor-vehicles, a brake-cylinder, a spring-pressed piston therein to actuate a brake, a valve-casing formed on said cylinder, a tapered three-way valve in said valve-casing, a spring to press said valve against its seat in said casing, a tap screwed upon said casing to hold said spring in position, said casing being formed with a cylinder-port communicating with said cylinder, an inlet-port communicating with a source of fluid under pressure and a discharge-pipe, a brake-handle and connections between said brake-handle and said valve to admit fluid to said cylinder to discharge such fluid through said discharge-pipe and to hold such fluid in said cylinder and a locking-piece connected to said handle to lock said valve in position to admit fluid to said cylinder.

JOHN UNSER.

Witnesses:
M. S. WILDER,
S. H. GALLAGHER.